June 14, 1938.     H. L. WILLIAMS     2,120,724
PHOTOGRAPHIC FILM REELER
Filed Oct. 10, 1936
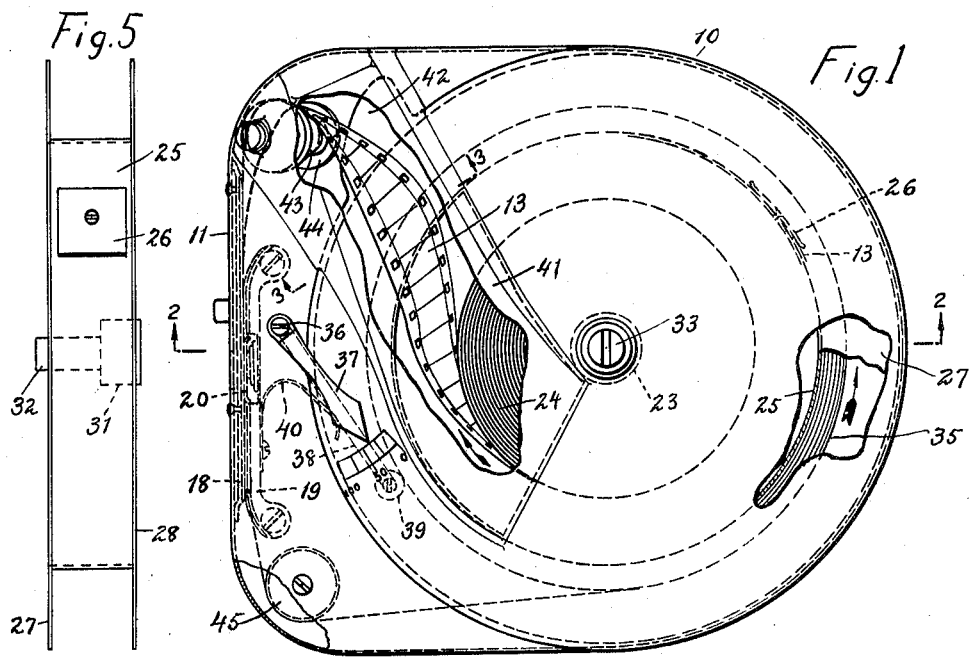
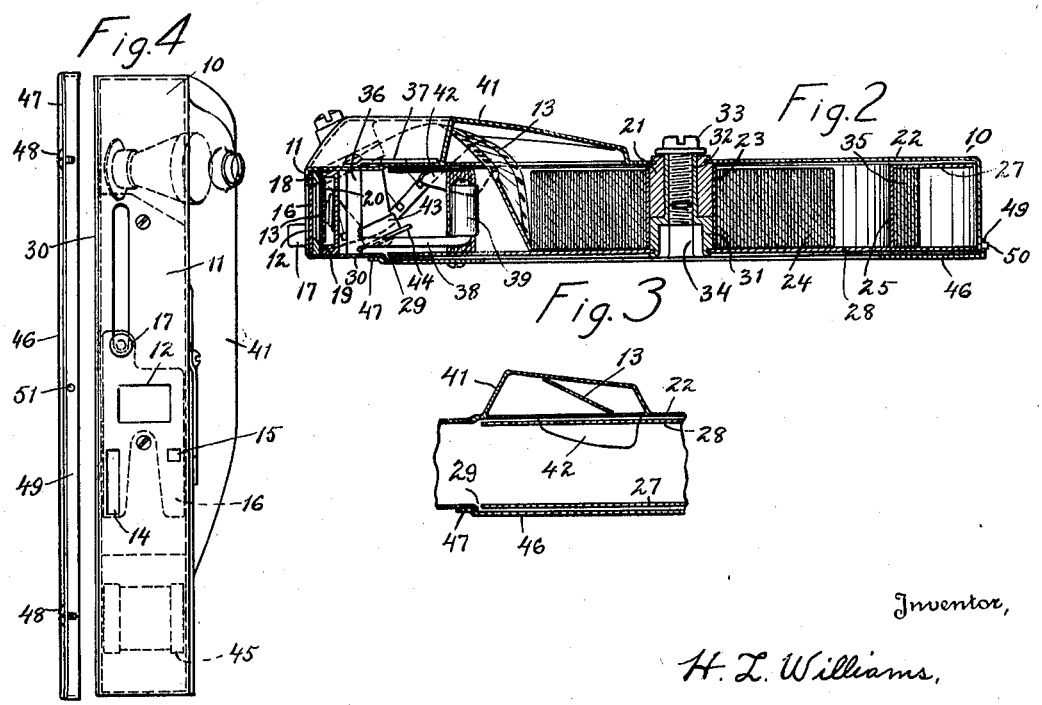
Inventor,
H. L. Williams,
By Robert M. Pierson,
Attorney Patented June 14, 1938

2,120,724

UNITED STATES PATENT OFFICE 2,120,724

PHOTOGRAPHIC FILM REELER

Herbert Lloyd Williams, Akron, Ohio

Application October 10, 1936, Serial No. 105,031

6 Claims. (Cl. 88—17)

This invention relates to strip reeling devices, and especially to film-strip handling apparatus for motion picture cameras. It has for its principal object to provide a compact arrangement of supply and take-up reels and film-guiding devices for reducing the camera space occupied by the film-handling means.

Space conservation, particularly as to the thickness of the camera, is highly important in amateur cinema photography, where it is desirable to have an apparatus of small weight and dimensions but of greater film capacity than those heretofore produced, which, in the smallest or pocket sizes, are quite generally limited to reels containing only 50 feet of film. The present invention, for example, permits the use of 100 foot reels in a pocket camera but slightly larger than present ones of 50 feet capacity.

The accompanying drawing illustrates the invention embodied in a removable film-roll cartridge, packet or magazine adapted for insertion as a unit in the camera and for loading, unloading and film development at the factory, and having means for a film-feeding connection with the camera mechanism, as is customary in pocket-size cinema cameras, but it could also be built into a camera in which the film reels only are removable, in accordance with another well known practice.

Of the drawing,

Fig. 1 is a left-hand side elevation, partly broken away and in section, showing my improved film-roll packet or magazine.

Fig. 2 is mainly a diametric section on the line 2—2 of Fig. 1.

Fig. 3 is a detail section on the line 3—3 of Fig. 1.

Fig. 4 is a front elevation, with the cover spaced from the casing.

Fig. 5 is an edge view of the empty take-up roll, as though viewed from the right in Fig. 1.

In the drawing, 10 is a flat, rectangular, magazine casing with rounded corners and having one of its narrower end walls, constituting the front wall 11, formed with the usual exposure window or opening 12 for the film 13, slot 14 at one side thereof for admitting the end of the usual reciprocating feeder pawl or claw in the perforations along one edge of the film, and additional small opening 15 for admitting the end of the check pawl which enters the perforations on the opposite edge of the film. When the packet or magazine is out of the camera, these openings are adapted to be closed by a shutter slide 16 having a finger knob 17 whose stem is movable in a slot in the casing wall. The film is positioned back of the exposure window between a guide-plate 18 and guide-shoe 19, and in line with said window it is forwardly pressed by a spring-projected friction plate 20, which parts are or may be of the usual construction.

Centrally journaled to turn freely on a post 21 attached to the left-hand wall 22 of the casing 10 is a spool or bearing sleeve 23 constituting a film-supply or let-off roll, on which is wound the unexposed film coil 24. Concentrically surrounding the supply roll is a take-up roll 25 mounted to turn independently of said supply roll and formed as a cylindrical body provided with a tangent spring clip plate or clamp 26 coacting with said body to act as a frictional gripper or fastener for the leading end of the film. This roll body is provided at its inner end with an integral circular flange or shroud 27, and at its outer end with a circular plate 28 which fills a circular opening 29 in the right-hand casing wall 30 and whose margin constitutes an outer flange or shroud while its center forms the bottom of the recessed take-up roll.

The take-up roll has a central stem 31 of the same diameter as the post 21, passing part way through the supply roll 23 to meet said post and complete the journal for the supply roll, and a reduced extension 32 on the inner end of said stem, passing through a bore of the post 21 and rotatably held to the casing wall 22 by a retaining screw 33. The opposite end of stem 31 is formed with a hexagonal socket 34 to receive the complemental arbor end of the usual wheel on the camera for rotating the take-up roll and winding the exposed film into a coil 35 thereon.

Pivoted in a bearing on the wall 22 is a pointer shaft 36 carrying at its outer end a quantity indicating pointer 37 movable over a scale, and at its inner end an arm 38 bearing a roller 39 which is held against the film coil 35 by a spring 40, whereby the approximate amount of exposed film in said coil is indicated.

On leaving the supply coil 24, the film 13 is partially twisted, directed out of the plane of said coil into a guide passage 41 formed on the casing wall 22 and bridging one margin of the take-up roll 25, and then directed back into said plane. Passage 41 has its entrance and exit inside of the casing and its outer wall forms a hump or ridge on the latter. Its entrance mouth is wide enough to accommodate the swing of the film as the diameter of the supply coil decreases. At the exit of said passage is a curved guide plate 42 for directing the inner edge of the film toward a loosely journaled guide roller 43 mounted in an inclined position at the upper front corner of the casing. Said roller has a lower end flange 44, its body is downwardly tapered or somewhat conical in form, and its middle reduced so that the film will contact with said roller only at the ends of its body and at the lower flange.

On entering the guide passage 41, the film is given a right-hand twist into a left-hand helix through somewhat less than a quadrant, and on leaving it and passing to and around the roller 43, it is twisted in the opposite direction and finally resumes its original posture in the plane of the supply roll. The film will take this course and feed properly under most conditions, even without the roller 43, but is guided with greater certainty by said roller. The friction of the film edges against the adjacent walls of the passage 41, with which said edges contact as shown in Fig. 3, tends to eliminate over-running of the film from the supply coil 24. From roller 43 the film passes substantially parallel to and immediately in back of the front casing wall 11, past the exposure window 12, between the guide plate 18 and shoe 19, and over the spring presser plate 20. 45 is a cylindrical guide roller loosely mounted in a horizontal position at the lower front corner of the casing, for directing the exposed film onto the take-up roll, where it is wound into the coil 35 on said take-up roll.

46 is a removable annular guard or cover for the margin of opening 29 in the right-hand wall of the casing, having a relatively shallow front marginal flange 47 secured on said casing wall by screws 48, and a slightly deeper rear flange 49 retained by a pin 50 on the rear wall of the casing, occupying a hole 50 in said flange 49, for excluding light and dust. On removing cover 46, removing the screw 33 and retracting the arm 38 by means of its pointer 37, the take-up and supply rolls 25 and 23 may successively be removed. This holder can be loaded with a coil 24 of unexposed film on the supply roll 23, while the take-up roll 25 is out, and the leading end of said film threaded through the guide passage 41, around the inclined guide roller 43, between the plate 18 and shoe 19, around the guide roller 45 and attached to the cylinder of said take-up roll by forcing it under the clip 26, whereupon the indicator is retracted, the take-up roll is placed in the casing around the supply roll, the indicator released, the screw 33 applied and the cover 46 is fastened in place. The film packet is then ready for insertion, when required, in a suitable compartment of the camera, where its take-up roll 25, and its film 13, on retraction of the window shutter 16, may connect respectively with the roll rotating and film-feeding devices of the camera. After the whole film has been exposed and run into the take-up coil 35 on the roll 25, the packet or cartridge may be removed from the camera and developed, and the casing reloaded with fresh film for use by the same owner or for resale if these operations are performed at the factory.

The concentric arrangement of supply and take-up rolls saves a large amount of space and it is possible to accommodate 100 feet of film in a pocket camera but slightly larger in dimensions than those now having a capacity of only 50 feet of film. The camera is also lighter, smaller and more convenient to handle than prior ones of equal capacity. While the inclusion of a quantity indicator is not strictly necessary, it performs a useful function in showing how much film has been used, and is particularly desirable where the operator employs a number of magazines with different kinds of film, and may wish to make a substitution before a particular film is used up and later restore the partially exhausted magazine.

It will be understood that the described embodiment may be more or less varied without departing from the scope of my invention as defined in the claims. For example, the direction of film feed could be reversed, if necessary slight changes were made in roll mounting and driving, in which case the described quantity indicator would show the amount of film remaining on the supply roll instead of that wound on the take-up roll.

I claim:

1. A removable film holder for motion picture cameras comprising a rotary take-up reel having means for connection with winding apparatus of the camera, said reel being centrally formed with a supply receptacle, closing means for said receptacle, having a film outlet, and an independently rotatable film supply roll in said receptacle, adapted to deliver the film from its outer periphery through said outlet, for winding on the outer periphery of said reel after being exposed in the camera.

2. A removable film magazine for motion picture cameras comprising a shallow, light-tight casing having an exposure window and adjacent openings for film feeding mechanism, a film supply roll and a surrounding take-up reel journaled on a wall of the casing, said take-up reel having means for separably connecting with film-winding mechanism of the camera, and means on the casing for directing the film strip from the outer periphery of the supply roll to the outer periphery of the take-up reel.

3. A film magazine for motion picture cameras comprising a casing having openings for exposing the film and connecting it with film-feeding mechanism of the camera, a take-up reel journaled on a wall of the casing and having means for connection with winding apparatus of the camera, said reel being centrally formed with a supply receptacle, an independently rotatably film supply roll in said receptacle, guide means on the casing receiving the unexposed film from the outer periphery of said supply roll, and means on the take-up reel for attaching the leading end of the film to the outer periphery of said reel to wind the exposed film thereon.

4. Strip reeling apparatus comprising a supply roll for a coiled strip, an annular take-up roll surrounding said supply roll, a casing enclosing said rolls, having an opening in one side for insertion and removal of the rolls and an opposite wall provided with means journaling the rolls, and means including a passage in said opposite wall bridging the rim of the take-up roll, and additional guiding devices, for directing the strip from the outer periphery of the supply roll, laterally from the plane of the latter, through said passage, again into said plane and onto the outer periphery of the take-up roll.

5. Photographic film-strip reeling apparatus comprising a casing having an exposure window, a strip supply roll and a take-up roll, one of which surrounds the other, and means for directing the unexposed strip past said exposure window, from the outer periphery of said supply roll, laterally out of and then back into its plane, and onto the outer periphery of the take-up roll.

6. Film-strip reeling apparatus for moving-picture cameras comprising a relatively-thin, flat casing having a narrow front end wall formed with an exposure opening, a fixed side wall having a film-guiding passage raised thereon for directing the film toward said exposure opening, an opposite side wall formed with an opening for insertion and removal of film rolls, a centrally recessed film take-up roll rotatably mounted on said fixed side wall of the casing and having an outer end flange plate substantially closing said roll opening in the opposite side wall, a film supply roll freely journaled on said fixed wall of the casing within the recess of said take-up roll, for delivering the strip from its outer periphery to said film-guiding passage, means for directing the strip from said film-guiding passage to and past the exposure opening, and means for directing the exposed film-strip onto the outer periphery of said take-up roll.

HERBERT LLOYD WILLIAMS.